(12) United States Patent
Chen et al.

(10) Patent No.: US 9,014,933 B2
(45) Date of Patent: Apr. 21, 2015

(54) ELECTRIC TOOL

(71) Applicant: Chervon (HK) Limited, Wanchai (HK)

(72) Inventors: Liang Chen, Nanjing (CN); Wu Chen, Nanjing (CN)

(73) Assignee: Chervon (HK) Limited (HK)

( * ) Notice: Subject to any disclaimer, the term of this patent is extended or adjusted under 35 U.S.C. 154(b) by 0 days.

(21) Appl. No.: 14/211,723

(22) Filed: Mar. 14, 2014

(65) Prior Publication Data

US 2014/0296020 A1 Oct. 2, 2014

(30) Foreign Application Priority Data

Mar. 29, 2013 (CN) .......................... 2013 1 0110507

(51) Int. Cl.
| | |
|---|---|
| *G06F 7/00* | (2006.01) |
| *G06F 17/00* | (2006.01) |
| *G06F 19/00* | (2011.01) |
| *B23Q 5/00* | (2006.01) |
| *E21B 17/22* | (2006.01) |
| *E21B 19/16* | (2006.01) |
| *E21B 19/18* | (2006.01) |
| *F16H 3/44* | (2006.01) |
| *F16H 1/28* | (2006.01) |
| *B25F 5/00* | (2006.01) |
| *B25B 21/00* | (2006.01) |
| *B25B 23/14* | (2006.01) |
| *B25B 23/147* | (2006.01) |

(52) U.S. Cl.
CPC .. *F16H 1/28* (2013.01); *B25F 5/00* (2013.01); *B25B 21/00* (2013.01); *B25B 23/14* (2013.01); *B25B 23/147* (2013.01)

(58) Field of Classification Search
None
See application file for complete search history.

(56) References Cited

U.S. PATENT DOCUMENTS

| | | | |
|---|---|---|---|
| 2002/0096342 A1* | 7/2002 | Milbourne | 173/178 |
| 2003/0070511 A1* | 4/2003 | Nottingham et al. | 81/54 |
| 2009/0098971 A1* | 4/2009 | Ho et al. | 475/153 |
| 2010/0163261 A1* | 7/2010 | Tomayko et al. | 173/47 |

* cited by examiner

*Primary Examiner* — Justin Holmes
*Assistant Examiner* — Timothy Hannon
(74) *Attorney, Agent, or Firm* — Greenberg Traurig, LLP (57) ABSTRACT

An electric tool has a housing, a motor disposed in the housing, an output shaft, a first planetary gear transmission mechanism, having a power input member, disposed between the motor and the output shaft, and a locking mechanism, having a power output member. The locking mechanism has a locked state and an unlocked state. When torsion is transmitted from the motor to the output shaft, the locking mechanism is in the unlocked state, and the output shaft is driven by the motor to rotate to perform electric operation. When the output shaft reversely receives a force, the locking mechanism is in the locked state, and the power input member of the first planetary gear transmission member is locked to perform manual operation.

12 Claims, 7 Drawing Sheets

ELECTRIC TOOL

RELATED APPLICATION INFORMATION

This application claims the benefit of CN 201310110507.8, filed on Mar. 29, 2013, the disclosure of which is incorporated herein by reference in its entirety.

BACKGROUND

The subject disclosure relates to an electric tool and, more particularly, to an electric tool having a function of an electric screw driver.

An electric screw driver, as a commonly-used household tool, has advantages such as portability, convenience, inexpensiveness, practical use and adaption for broad user groups. However, a non-professional or do-it-yourself ("DIY") user, particularly, a housewife, the elderly and so on may have difficulty in controlling a screw advance depth, a bolt pretensioned torsion or the like so that usually such user's work fails or proves imperfect.

In the prior art, partial screw drivers have a mechanical torsion cup which is provided with a plurality of gearshifts adapted for different operation conditions respectively. However, since torsion values corresponding to the respective gearshifts are certain, the user cannot select a suitable gearshift completely according to their needs. If a corresponding gearshift cannot be selected, a close gearshift can only be selected. In this case, the user usually cannot duly control the machine to precisely complete the work, unless he has an excellent operation techniques and rich experiences.

In addition, even if the user selects a corresponding gearshift, it is usual that a screw is not screwed in place or screwed too tightly when the screw is screwed. In practice, the user usually desires to manually rotate the screw tight when the screw is about to be screwed tight, to ensure that the screw is screwed in place. However, such operation mode including electrical operation and manual operation is time-consuming and labor-consuming in the event of a large workload and therefore causes a lower working efficiency.

SUMMARY

The following describes an electric tool which is intended to overcome the drawbacks in the prior art by providing an electric tool which can memorize a torsion inputted by an operator upon manual operation and operate according to the torsion.

A non-limiting example of such an electric tool is described hereinafter and includes a housing, a motor disposed in the housing, an output shaft, a first planetary gear transmission mechanism disposed between the motor and the output shaft, the first planetary gear transmission mechanism comprising a power input member; and a locking mechanism comprising a power output member and having a locked state and an unlocked state. When torsion is transmitted from the motor to the output shaft, the locking mechanism is in the unlocked state, and the output shaft is driven by the motor to rotate to perform electric operation. When the output shaft reversely receives a force, the locking mechanism is in the locked state, and the power input member of the first planetary gear transmission member is locked to perform manual operation, and the locking mechanism is connected to the output shaft via the first planetary gear transmission mechanism, and the power output member of the locking mechanism is non-rotatably connected to the power input member of the first planetary gear transmission member.

A further exemplary electric tool described hereinafter includes a housing, a motor disposed in the housing, an output shaft, a first planetary gear transmission mechanism disposed between the motor and the output shaft, the first planetary gear transmission mechanism comprising a first inner ring gear; and a locking mechanism having a locked state and an unlocked state. When torsion is transmitted from the motor to the output shaft, the locking mechanism is in the unlocked state, and the output shaft is driven by the motor to rotate to perform electric operation. When the output shaft reversely receives a force, the locking mechanism is in the locked state, and the first inner ring gear is locked to perform manual operation, and the locking mechanism is connected to the output shaft via the first planetary gear transmission mechanism. The electric tool also includes a torsion control system which comprises a torsion detecting module for detecting the torsion received by the first inner ring gear, and a controller electrically connected to the torsion detecting module. When the locking mechanism is in the locked state, the torsion detecting module detects the torsion received by the first inner ring gear and converts it into a first electronic parameter and stores it. When the locking mechanism is in the unlocked state, the torsion detecting module detects a second electronic parameter corresponding to the real-time torsion received by the first inner ring gear, and the controller stops supplying electrical power to the motor, when the second electronic parameter is greater than or equal to the first electronic parameter.

As additionally described, an exemplary electric tool stores in a memory the electronic parameter corresponding to the torsion needed, when the operator manually rotates the screw tight. When the same type of screw is screwed tight in the electric operation mode, the electric tool measures the electronic parameter in real time and compares it with the stored electronic parameter. When the real-time electronic parameter is greater than or equal to the stored electronic parameter, the electric tool automatically stops operation, thereby achieving a function of memorizing the torsion, operating repeatedly according to the torsion and automatically controlling the operation of the electric tool. Therefore, the exemplary, described electric tool provides more visual torsion sensing, effectively boosts DIY user's use skills, and improves work efficiency.

DETAILED DESCRIPTION

Figure 1:
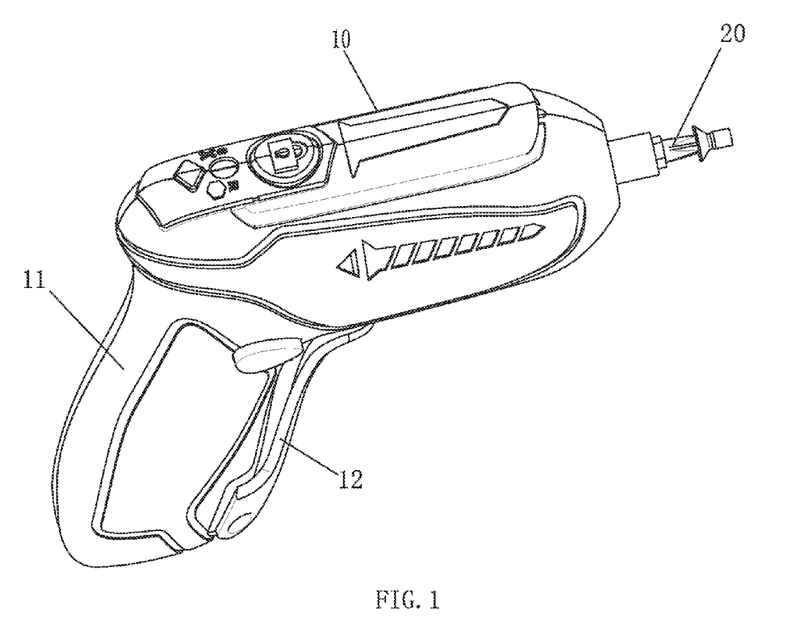
FIG. 1 is a perspective view of an exemplary electrical tool constructed according to the description which follows.

As shown in FIG. 1, an exemplary electric tool has a housing 10 and a screwdriver bit 20 extending out of the housing 10, wherein a handle 11 is formed on the housing 10 for an operator to hold, and a switch trigger 12 is mounted on the housing adjacent to the handle 11 to facilitate the operator controlling the electric tool.

Figure 2:
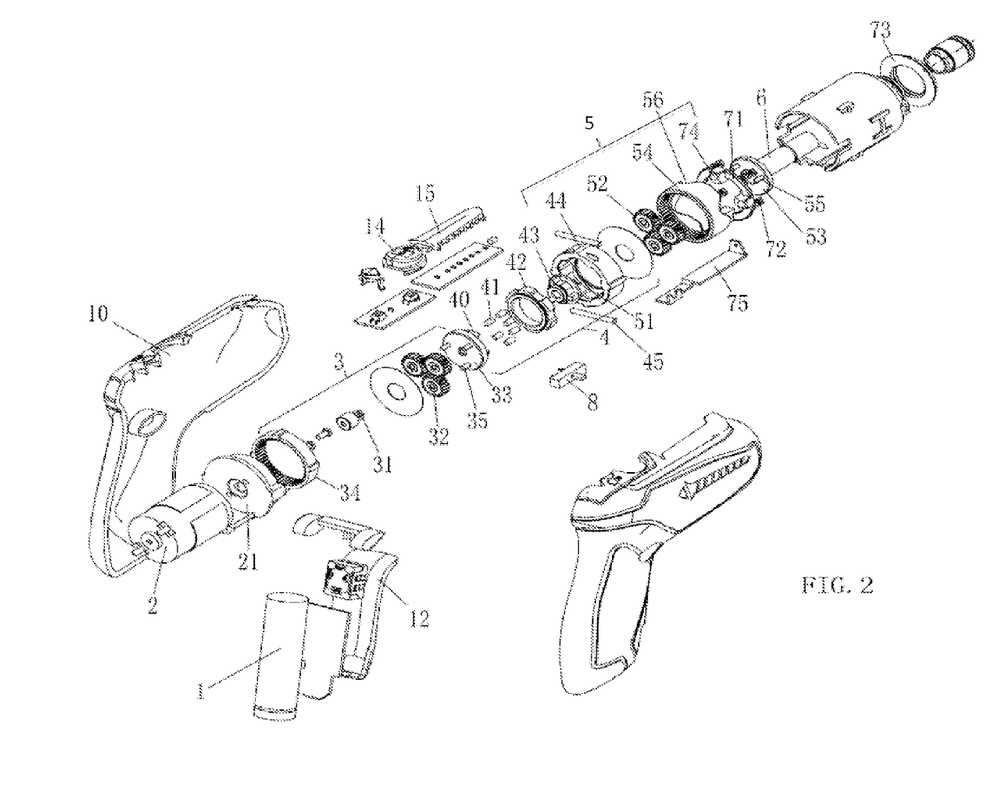
FIG. 2 is an exploded view of the exemplary electric tool of FIG. 1.

As shown in FIG. 2, a battery 1, a motor 2 and a transmission device are received in the housing 10. The battery 1 is located in the handle 11 and is electrically connected to the switch trigger 12 and the motor 2. The motor 2 is connected to the screwdriver bit 20 via the transmission device and drives the screwdriver bit 20 to rotate and thereby rotate a screw tight.

The illustrated transmission device has a first planetary gear transmission mechanism 5, a locking mechanism 4 and a second planetary gear transmission mechanism 3. The first planetary gear transmission mechanism is connected to an output shaft 6. The second planetary gear transmission mechanism 3 is connected to the motor 2. The locking mechanism 4 is located between the first planetary gear transmission mechanism 5 and the second planetary gear transmission mechanism 3.

The second planetary gear transmission mechanism 3 comprises a second sun gear 31, a second set of planet gears 32, a second planet carrier 33 and a second inner ring gear 34. The second sun gear 31 is non-rotatably connected to an output shaft of the motor 2 and rotary-driven by the motor 2, the second inner ring gear 34 is fixedly connected to a motor cover plate 21 via a screw, so the second inner ring gear 34 is fixedly and unmovably mounted in the housing 10. The second set of planet gears 32 simultaneously meshes with the second sun gear 31 and the second inner ring gear 34, and is rotatably mounted on the second planet carrier 33 via a pin 35. When the second sun gear 31 is rotary-driven by the motor 2, the second set of planet gears 32 revolves around the second sun gear 31 and rotates at the same time and thereby drives the second planet carrier 33 connected thereto to rotate.

Figure 3:
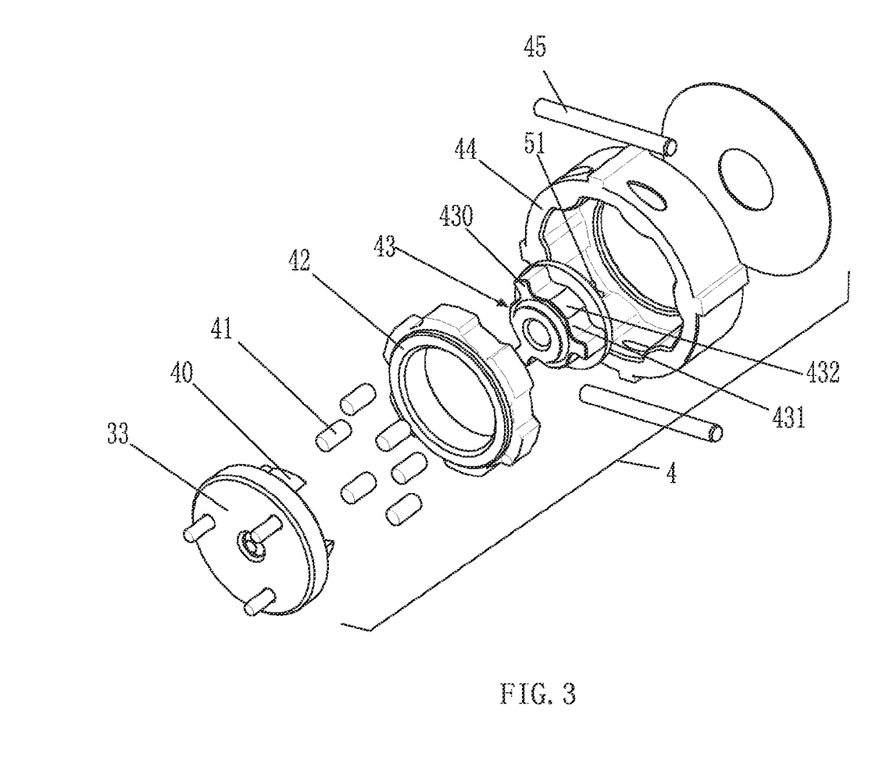
FIG. 3 is an exploded view of an exemplary locking mechanism.

As shown in FIG. 3, the locking mechanism 4 has a limiting portion 40, a locking pin 41, a fixing ring 42, a locking member 43, a mounting ring 44 and a mounting pin 45. The limiting portion 40, the locking pin 41 and the locking member 43 are mounted in the fixing ring 42, the fixing ring 42 is non-rotatably mounted in the mounting ring 44, and the mounting ring 44 is mounted on the housing 10 via the mounting pin 45. The locking member 43 serves as a power output member of the locking mechanism 4.

Figure 4:
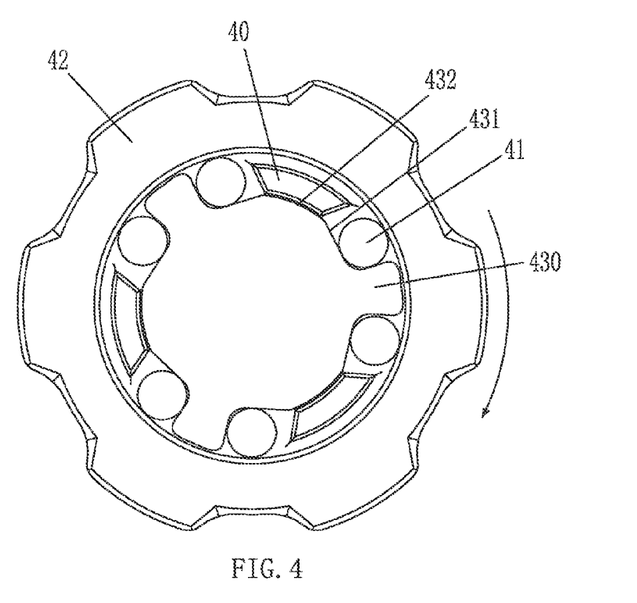
FIG. 4 is a cross-sectional view of the exemplary locking mechanism in an unlocked state.
Figure 5:
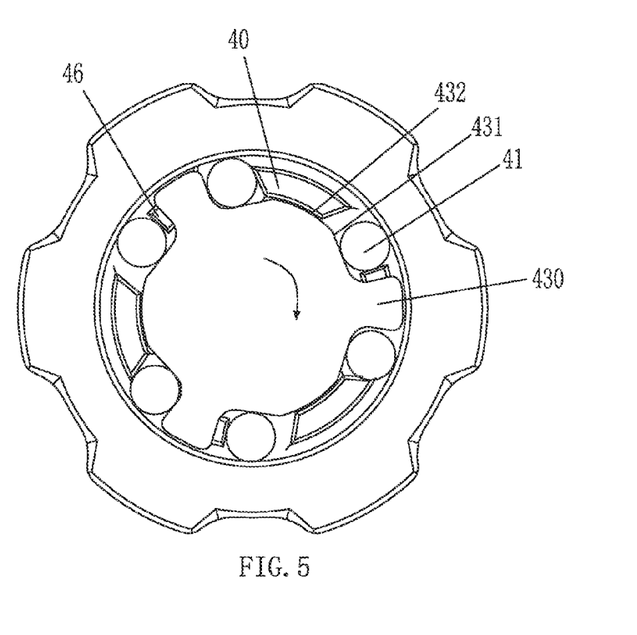
FIG. 5 is a cross-sectional view of the exemplary locking mechanism in a locked state.

The limiting portion 40 is fixedly connected to the second planet carrier 33, and a boss 46 (as shown in FIG. 5) is disposed between two adjacent limiting portions 40. The locking member 43 comprises three positioning blocks 430, wherein two adjacent positioning blocks 430 are connected via two flat surfaces 431 and a cam surface 432. The cam surface 432 is located between the two flat surfaces 431. As shown in FIG. 4, in an assembled state, the second planet carrier 33 abuts against the locking member 43, and the positioning block 430 aligns with the boss 46. In a circumferential direction, each locking pin 41 is located between the limiting potion 40 and the positioning block 430. In a radial direction, the locking pin 43 is located in a gap between the fixing ring 42 and the locking member 43, specifically between an inner surface of the fixing ring 42 and the flat surface 431.

The first planetary gear transmission mechanism 5 comprises a first sun gear 51, a first set of planet gears 52, a first planet carrier 53 and a first inner ring 54. The first sun gear 51, serving as a power input member of the first planetary gear transmission mechanism 5, is non-rotatably connected to the locking member 43, that is, relative rotation does not exist between the first sun gear 51 and the locking member 43. The first set of planet gears 52 is connected to the first planet carrier 53 via a pin 55, and an output shaft 6 is non-rotatably connected to the first planet carrier 53. When the locking member 43 rotates, the first sun gear 51 rotates along with it and drives the first set of planet gears 52 to rotate through the meshing between the first sun gear 51 and the first set of planet gears 52, then drives the first planet carrier 53 and the output shaft 6 fixedly connected thereto to rotate, and finally drives the screwdriver bit 20 connected to the output shaft 6 to rotate to thereby rotatably feed the screw into a workpiece. Meanwhile, the first inner ring 54 is brought into rotation by the first set of planet gears 52.

As shown in FIG. 4, when the operator pulls the switch trigger 12 and starts the motor 2, a torsion is transmitted from the motor 2 to the output shaft 6. The motor 2 directly drives the second sun gear 31 to rotate, and drives the second planet carrier 33 to rotate via the second planetary gear transmission mechanism 3, then drives the limiting portion 40 fixed on the second planet carrier 33 to rotate, for example, to rotate in a clockwise direction as shown in FIG. 4. The limiting portion 40 pushes the locking pin 42 to move, and the locking pin 41 pushes the positioning block 430 so that the locking member 43 is driven to rotate. This state is an unlocked state of the locking mechanism 4. The locking member 43 drives the first sun gear 51 fixedly connected thereto to rotate, and drives the first planet carrier 53 to rotate via the first planetary gear transmission mechanism 5, and finally drives the output shaft 6 fixedly connected to the first planet carrier 53 to rotate so that the torsion is transmitted from the motor 2 to the output shaft 6, and then the screwdriver bit 20 is used to rotatably feed the screw into a workpiece. This is an electrically-driven operation mode of the electric tool. On the contrary, as shown in FIG. 5, when the torsion is transmitted reversely, i.e., when the operator does not start the motor 2, but rotates the screw manually, the operator tightly holds the housing 10 and rotates the screwdriver bit 20 and the output shaft 6. The output shaft 6 receives a force reversely, and the first planet carrier 53 fixedly connected to the output shaft 6 rotates along with it, drives the first sun gear 51 and the first inner ring gear 54 to rotate through the first planetary gear transmission mechanism 5. The first sun gear 51 then brings the locking member 43 fixedly connected thereto to rotate together, e.g., rotate in a clockwise direction as shown in FIG. 5. Since the locking pin 41 is locked between the fixing ring 42 and the flat surface 431, the locking member 43 cannot push the locking pin 41 to move, and power of the locking member 43 is transmitted to the fixing ring 42 via the locking pin 41. The fixing ring 42 is fixedly connected to the mounting ring 44, and the mounting ring 44 is fixed on the housing 10 via the mounting pin 45. Therefore, the power of the locking member 43 is finally transmitted to the housing 10. Hence, the operator may rotatably feed the screw into a workpiece manually while the motor 2 does not rotate. This is a locked state of the locking mechanism 4, namely, a manual operation mode of the electric tool.

An exemplary electric tool may also include a torsion control system which can memorize the torsion input by the operator upon manual operation, and which, when the same kind of screws are electrically operated, can automatically complete the screwing operation by using the memorized torsion such that the subsequent output torsion is the same as the torsion needed by the operator.

The torsion control system comprises a torsion detecting module for detecting the torsion received by the first inner ring gear and a controller electrically connected to the torsion detecting module. The torsion detecting module comprises a displacement detecting mechanism and an electronic converter. As shown in FIG. 2, the displacement detecting mechanism comprises a V-shaped groove 56 disposed on the inner ring gear 54 and opening towards the output shaft 6 and an axially moving ring 71. The moving ring 71 is connected to a baffle 73 via a spring 72, and the baffle 73 is fixed on the housing 10, so the moving ring 71 may axially move against a spring force. The moving ring 71 is provided with protrusions 74 able to mate with the V-shaped grooves 56, the protrusions 74 are located in the V-shaped grooves 56 and are movable along a slope of the V-shaped grooves 56. When the first inner ring gear 54 rotates, the V-shaped grooves 56 push the protrusions 74 to move along their slopes and thereby push the whole moving ring 71 to move axially against the spring force, thereby converting a circumferential movement of the first inner ring gear 54 into an axial movement of the moving ring 71. The electronic converter 8 is connected to the moving ring 71 via a connecting rod 75, so the axial movement of the moving ring 71 is transmitted to the electronic converter 8 via the connecting rod 75, and the electronic converter 8 converts an axial displacement of the moving ring 71 into an electronic parameter. In this embodiment, the electronic converter 8 is a sliding rheostat which can convert the axial displacement of the moving ring 71 into resistance values. In other embodiments, the electronic converter may also employ a sensor or potentiometer.

Figure 6:
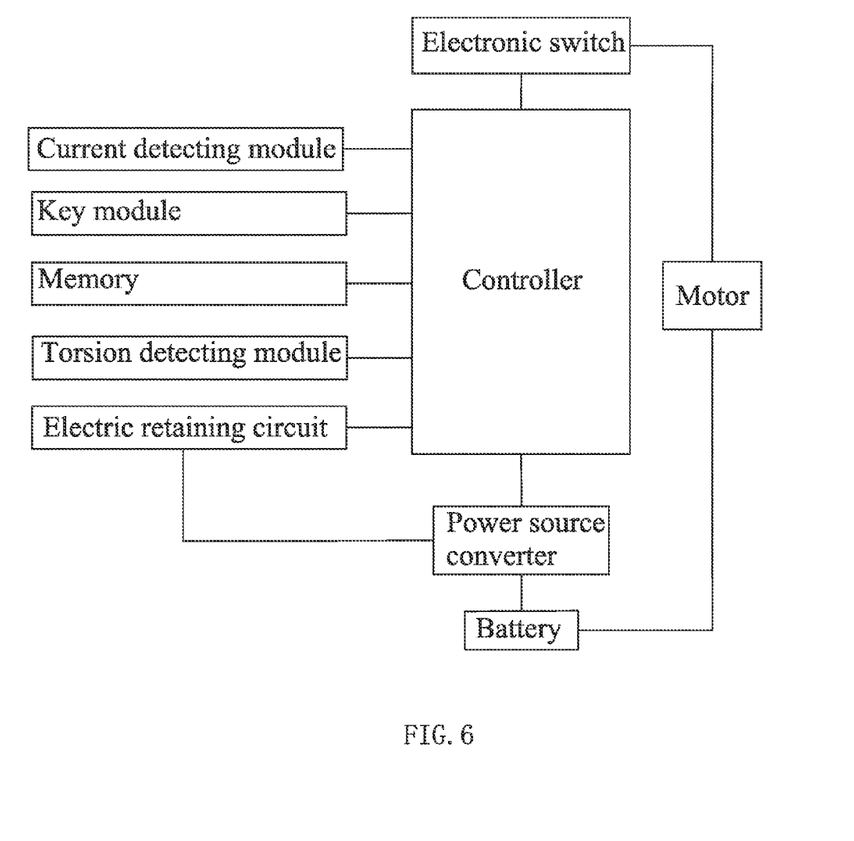
FIG. 6 is a block diagram of an exemplary circuit of the electric tool.

As shown in FIG. 6, a circuit of the electric tool has a controller and a current detecting module, a key module, a memory, a torsion detecting module and an electrical retaining circuit electrically connected to the controller. The battery is electrically connected to the controller and the electric retaining circuit via a power source converter, to supply electrical power to the controller and the electric retaining circuit. Meanwhile, the battery is also connected to the motor to supply electrical power to the motor. The controller is connected to the motor via an electronic switch to control on and off of the motor.

Figure 7:
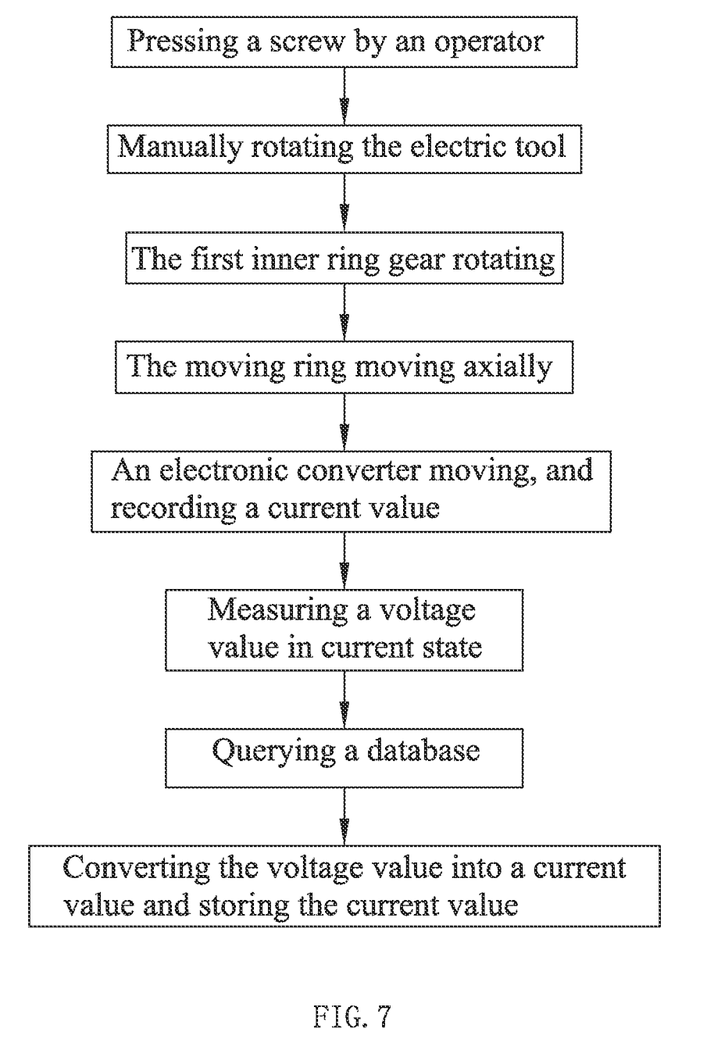
FIG. 7 is a logic diagram illustrating exemplary steps when the electric tool is used to manually rotate the screw tight.

As shown in FIG. 7, in the manual operation mode, the operator presses the screw and manually rotates the electric tool so that the output shaft 6 rotates and thus drives the first inner ring gear 54 to rotate via the first planetary gear transmission mechanism 5. Through the cooperation of the V-shaped grooves 56 and the protrusions 74, the circumferential movement of the first inner ring gear 54 is converted into the axial movement of the moving ring 71, then the axial movement of the moving ring 71 is transmitted to the electronic converter 8 via the connecting rod 75, and subsequently the electronic converter 8 converts the axial displacement into an electronic signal which is recorded into the controller by AD sampling. At this time, a voltage value under the current state is measured, a database program is queried, and the voltage value is converted into a corresponding current value and stored in a memory as a first electronic parameter. In this way, the torsion of the operator's manual operation is detected and converted into the first electronic parameter which is to be stored and memorized in the electric tool.

Figure 8:
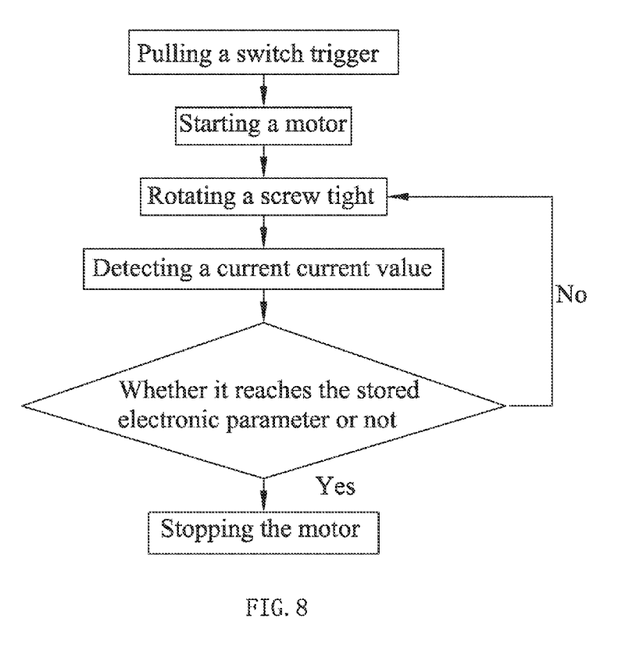
FIG. 8 is a logic diagram illustrating exemplary steps when the electric tool is used to electrically rotate the screw tight.

As shown in FIG. 8, in the electric operation mode, the operator presses the switch trigger 12 and the motor 2 drives the screw into a workpiece. In the screwing procedure, the current tends to rise, the current detecting module detects an actual current as a second electronic parameter for comparison with the stored current value (the first electronic parameter). When the actual current value is greater than or equal to the stored current value, the controller controls the motor to stop. Hence, in the electric operation mode, the screwing force outputted by the electric tool is equal to the torsion exerted by the operator's wrist in the manual operation mode, i.e., the electric tool can memorize the operator's torsion upon manual operation, and automatically rotates the screw tightly with the same magnitude of torsion, which completely meets the operator's need for the torsion.

Figure 9:
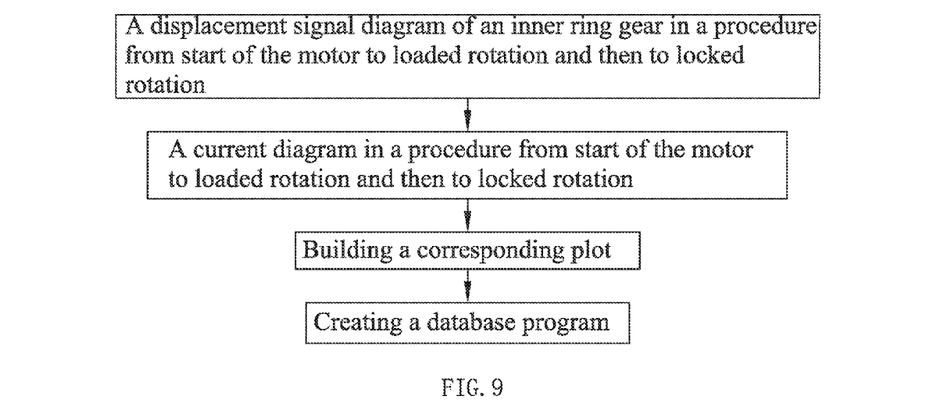
FIG. 9 is a logic diagram illustrating exemplary steps for building a database.

As shown in FIG. 9, it illustrates the building of the above database. First, the motor is allowed to start, then to rotate with load and then to rotate in a locked manner to obtain a displacement signal diagram of the first inner ring gear during this procedure; secondly, the motor is allowed to start, then to rotate with load and then to rotate in a locked manner to obtain a current diagram in this procedure; finally, a corresponding plot of the displacement of the first inner ring gear versus the current is built to thereby form a database program.

As another embodiment, in the electric operation mode, the second electronic parameter is not directly detected via the current detecting module, but through detecting a real-time torsion received by the first inner ring gear by the torsion detecting module at first, and then converting the real-time torsion into a current value and finally comparing it as the second electronic parameter with the first electronic parameter.

Preferably, the housing 10 of the electric tool is further provided with a torsion display bar 15 and a torsion locking button 14. During operation, the torsion display bar 15 may visually display the magnitude of the torsion in real time. The torsion locking button 14 is used to allow the electric tool to lock or memorize the current torsion value. In the manual operation mode, when the screw is manually screwed tight, the operator presses the torsion locking button 14 and a current value corresponding to the torsion value at this time is stored. In subsequent electric operation mode, the electric tool will use the same torsion to rotate the screw tight.

The electric tool described in this document is not to be limited to the described embodiments and/or to the structures represented by the figures. Rather, obvious changes, substitutions or amendments to the shapes and positions of the members made on the basis of the subject disclosure are intended to fall within the scope of the claims presented.

What is claimed is:
1. An electric tool, comprising:
a housing;
a motor disposed in the housing;
an output shaft;
a first planetary gear transmission mechanism disposed between the motor and the output shaft, the first planetary gear transmission mechanism comprising a power input member; and
a locking mechanism comprising a power output member and having a locked state and an unlocked state;
wherein when a torsion is transmitted from the motor to the output shaft, the locking mechanism is in the unlocked state, and the output shaft is driven by the motor to rotate to perform electric operation and, when the output shaft reversely receives a force, the locking mechanism is in the locked state, and the power input member of the first planetary gear transmission member is locked to perform manual operation; and
wherein the locking mechanism is connected to the output shaft via the first planetary gear transmission mechanism, the power output member of the locking mechanism is non-rotatably connected to the power input member of the first planetary gear transmission member, the first planetary gear transmission mechanism comprises a first sun gear, a first set of planet gears, a first inner ring gear and a first planet carrier, the first planet carrier is non-rotatably connected to the output shaft, and the power input member of the first planetary gear transmission mechanism is the first sun gear.

2. The electric tool according to claim 1, wherein the locking mechanism comprises a limiting portion, locking pins, a locking member and a fixing ring, wherein the limiting portion, the locking pins and the locking member are mounted in the fixing ring, one locking pin being provided on both sides of the limiting portion, and in a radial direction the locking pins being located in a gap between the fixing ring and a locking ring, the power output member of the locking mechanism being the locking member, and the locking member being non-rotatably connected to the first sun gear.

3. The electric tool according to claim 2, further comprising a second planetary gear transmission mechanism connected between the motor and the locking mechanism, the second planetary gear transmission mechanism comprising a second sun gear, a second set of planet gears, a second inner ring gear and a second planet carrier, wherein the second sun gear is rotatably driven by the motor, and the limiting portion of the locking mechanism is formed on the second planet carrier.

4. The electric tool according to claim 3, further comprising a torsion detecting module for detecting a torsion received by the first inner ring gear, the torsion detecting module comprising a displacement detecting mechanism and an electronic converter, the electronic converter being connected to the displacement detecting mechanism via a connecting rod and used to convert displacement detected by the displacement detecting mechanism into an electronic parameter.

5. The electric tool according to claim 4, wherein the displacement detecting mechanism comprises a V-shaped groove disposed on the first inner ring gear and opening towards the output shaft and an axially moving ring, the moving ring being mounted in the housing via an elastic member, the moving ring being provided with protrusions being able to mate with the V-shaped grooves, wherein the protrusions are located in the V-shaped grooves and are movable along a surface of the V-shaped grooves; and wherein when the first inner ring gear rotates, the protrusions push the moving ring to move axially against the biasing force of the elastic member.

6. An electric tool, comprising:
a housing,
a motor disposed in the housing,
an output shaft,
a first planetary gear transmission mechanism disposed between the motor and the output shaft, the first planetary gear transmission mechanism comprising a first inner ring gear;
a locking mechanism having a locked state and an unlocked state; wherein when the torsion is transmitted from the motor to the output shaft, the locking mechanism is in the unlocked state, and the output shaft is driven by the motor to rotate to perform electric operation; and when the output shaft reversely receives a force, the locking mechanism is in the locked state, and the output shaft is locked to perform manual operation;
wherein the locking mechanism is connected to the output shaft via the first planetary gear transmission mechanism, and the electric tool further comprises a torsion control system which comprises:
a torsion detecting module for detecting the torsion received by the first inner ring gear, and
a controller electrically connected to the torsion detecting module;
wherein when the locking mechanism is in the locked state, the torsion detecting module detects the torsion received by the first inner ring gear and converts it into a first electronic parameter and stores it and, when the locking mechanism is in the unlocked state, the torsion detecting module detects a second electronic parameter corresponding to the real-time torsion received by the first inner ring gear, and the controller stops supplying electrical power to the motor when the second electronic parameter is greater than or equal to the first electronic parameter.

7. The electric tool according to claim 6, wherein the torsion detecting module comprises a displacement detecting mechanism for converting a circumferential movement of the first inner ring gear into axial displacement, and an electronic converter, the electronic converter being connected to the displacement detecting mechanism via a connecting rod to convert the torsion received by the first inner ring gear into an electronic signal.

8. The electric tool according to claim 7, further comprising a database for storing a plot of the first electronic parameter versus the axial displacement of the first inner ring gear.

9. The electric tool according to claim 8, wherein the electronic signal is recorded into the controller by AD sampling, and the current voltage value is measured and converted into a corresponding current value by querying a database.

10. The electric tool according to claim 9, wherein the second electronic parameter is a current parameter into which the torsion received by the first inner ring gear is converted, or which is in linear relationship with the torsion.

11. The electric tool according to claim 10, further comprising a torsion locking button mounted on the housing and used to store the first electronic parameter in the memory.

12. The electric tool according to claim 11, further comprising a torsion display bar mounted on the housing to display the magnitude of the torsion.

* * * * *